United States Patent
Nakai et al.

(10) Patent No.: US 7,701,611 B2
(45) Date of Patent: Apr. 20, 2010

(54) IMAGE PROCESSING APPARATUS

(75) Inventors: Yoshiyuki Nakai, Nara (JP); Yohichi Shimazawa, Nara (JP); Koichi Sumida, Nara (JP); Takashi Nishimachi, Nara (JP); Takahiro Minami, Nara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 261 days.

(21) Appl. No.: 11/977,104

(22) Filed: Oct. 23, 2007

(65) Prior Publication Data
US 2008/0094665 A1 Apr. 24, 2008

(30) Foreign Application Priority Data
Oct. 23, 2006 (JP) .............................. 2006-288124

(51) Int. Cl.
G06K 1/00 (2006.01)
G06K 15/00 (2006.01)
G06K 9/00 (2006.01)
G06K 9/46 (2006.01)
H04N 1/40 (2006.01)
H04N 1/00 (2006.01)

(52) U.S. Cl. ...................... 358/1.9; 358/3.28; 358/1.14; 358/401; 382/181; 382/190; 382/191

(58) Field of Classification Search .................. 358/1.9, 358/1.14, 1.15, 1.16, 1.13, 404, 468, 3.28, 358/401; 382/218, 181, 190, 191; 710/19; 399/15, 10, 36, 49, 60, 72
See application file for complete search history.

(56) References Cited

U.S. PATENT DOCUMENTS

| 7,057,762 | B1 * | 6/2006 | Watanabe | 358/1.16 |
|---|---|---|---|---|
| 7,139,438 | B2 | 11/2006 | Shimazawa | |
| 7,509,060 | B2 * | 3/2009 | Yaguchi et al. | 399/15 |
| 2002/0054692 | A1 | 5/2002 | Suzuki et al. | |
| 2004/0184065 | A1 * | 9/2004 | Guan et al. | 358/1.14 |

FOREIGN PATENT DOCUMENTS

| CN | 1307313 A | 8/2001 |
|---|---|---|
| JP | 2000-253242 | 9/2000 |
| JP | 2001-167267 | 6/2001 |
| JP | 2001-218044 | 8/2001 |
| JP | 2002-125102 A | 4/2002 |
| JP | 2003-99788 A | 4/2003 |

* cited by examiner

*Primary Examiner*—Edward Coles
*Assistant Examiner*—Charlotte M Baker
(74) *Attorney, Agent, or Firm*—Edwards Angell Palmer & Dodge LLP; David G. Conlin; David A. Tucker

(57) ABSTRACT

The present invention provides an image processing apparatus including: an image reading section for reading a document image; a particular image determining section for determining whether or not a particular image is included in image data read by the image reading section; an image processing section for processing the image data; and a resolution converting section for changing a resolution of the image data to be transferred to the particular image determining section, wherein the resolution converting section lowers a pixel frequency of the image data to be transmitted to the particular image determining section so as to perform simple processing. The lowered pixel frequency slows down processing speed of the image data and thereby improves determination accuracy.

6 Claims, 4 Drawing Sheets

IMAGE PROCESSING APPARATUS

BACKGROUND OF THE INVENTION

1. Field of the Invention

The present invention relates to an image processing apparatus and an image processing method which limit processing such as copying, facsimile communication and data transmission based on a particular image included in image data.

2. Description of the Related Art

An image processing apparatus performs processing of inputting image data and outputting it by copying, facsimile communication or data transmission. If a particular image is included in the image data, the processing to be executed is limited, such as inhibition of processing. It is thereby possible to prevent unauthorized use of the inputted image data.

Japanese Patent Laid-Open No. 2001-218044 describes an image input-output apparatus including: an input section for inputting image data; a dividing section for dividing the image data inputted by the input section into small areas; a determining section for determining whether or not a predetermined image is included in each of the small areas; a control section for controlling output of the image data in the case where the determining section determines that the predetermined image is included; and a converting section for converting a resolution of the image data, wherein the determining section makes a first determination by using the image data of which the resolution is lowered by thinning pixels from the image data with the converting section, and makes a second determination by using the image data of which the resolution is higher than that of the image data used for the first determination in the case where it cannot be determined by the first determination whether or not the predetermined image is included in the image data so as to reduce a load due to a determination process of a particular document and securely prevent counterfeiting action.

Japanese Patent Laid-Open No. 2001-167267 describes that density of a read image is converted by multiple density converting sections, and one of output images thereof is selected so that a characteristic amount comparing section recognizes whether or not a particular document image is included in the selected output image so as to improve a recognition rate.

According to Japanese Patent Laid-Open No. 2001-218044 and Japanese Patent Laid-Open No. 2001-167267, the load due to the determination process of a particular image is reduced. However, further measures for reducing the load are presently demanded. And further improvement in accuracy of the determination process is presently demanded.

In view of the problem, an object of the present invention is to provide an image processing apparatus and an image processing method which can further reduce the load due to the determination process of a particular image and improve the accuracy of the determination process.

SUMMARY OF THE INVENTION

To attain the object, the present invention provides an image processing apparatus including: an image reading section for reading a document image; a particular image determining section for determining whether or not a particular image is included in image data read by the image reading section; an image processing section for processing the image data; and a resolution converting section for changing a resolution of the image data to be transferred to the particular image determining section, wherein the resolution converting section varies a pixel frequency of the image data to be transmitted to the particular image determining section.

The image reading section reads a document image, and the resolution converting section changes the resolution of the read image data. Next, the particular image determining section determines whether or not a particular image is included in the image data of which the resolution has been converted, and the image data is processed based on a determination result thereof.

In this case, the resolution converting section varies the pixel frequency of the image data to be transmitted for determination of the particular image. For instance, it lowers the pixel frequency of the image data. It is thereby possible to reduce the number of gates of the particular image determining section in comparison with the case where the pixel frequency of the image data is high. Thus, cost reduction of the apparatus becomes possible by that much.

Moreover, a transfer rate of the image data transmitted from the resolution converting section to the particular image determining section and a processing speed of the particular image determining section are slowed down. Processing time per pixel is extended by that much so as to allow accuracy of the determination of the particular image to be improved.

The resolution converting section varies the pixel frequency of the image data according to a variable magnification of the image data. For instance, if a reading document is A4 size, a printing document is A4 size, and a magnification ratio is set at 400%, only the image data of ¼ of the document from a reference point for placing a document is read without reading the rest of the image as shown in FIG. 4.

This is because an image processing area for printing and the like varies according to a set magnification and so only a printable image area is read. For that reason, if the set magnification becomes higher (if the magnification ratio becomes larger), a data amount of the image data is reduced so that the pixel frequency of the image data can be lowered.

The image processing apparatus including an edit function can set a reading area when reading the image data. Therefore, by lowering the pixel frequency according to the set area (dimensions), it is possible to increase the processing time per pixel so that detection accuracy of the particular image can be improved.

The image data read by the image reading section is transferred to the image processing section and to the particular image determining section by different buses. Thus, the determination process of the particular image is concurrently processed with the image processing, and so rapid processing becomes possible by that much.

As described above, according to the present invention, the pixel frequency of the image data to be transmitted to the particular image determining section is rendered variable in order to lower it. Therefore, it is possible to promote reduction in the load due to the determination process of a particular image and further improve the accuracy of the determination process.

DETAILED DESCRIPTION OF THE PREFERRED EMBODIMENTS

Figure 1:
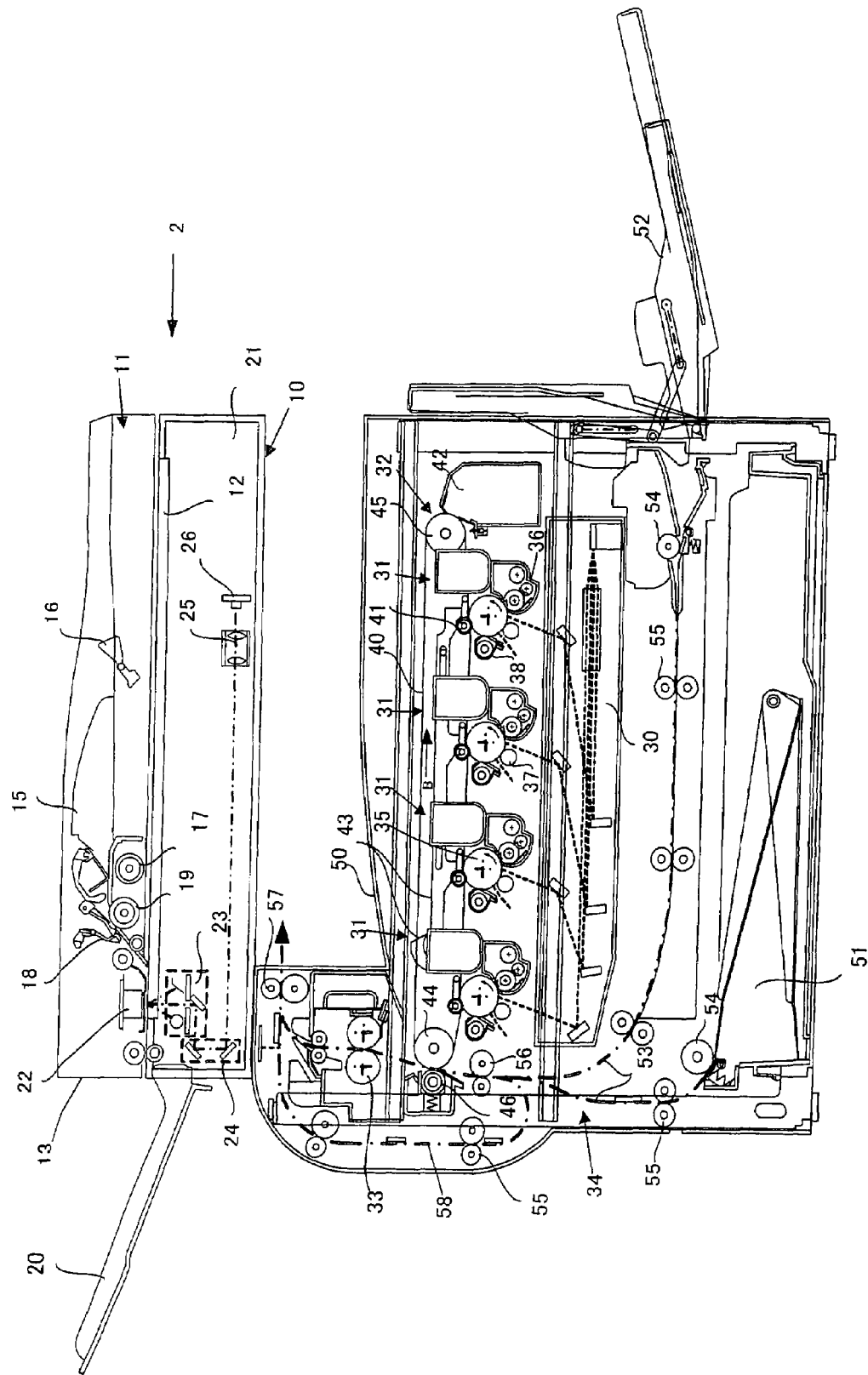
FIG. 1 is a diagram showing a schematic overall configuration of an image processing apparatus according to the present invention.
Figure 2:
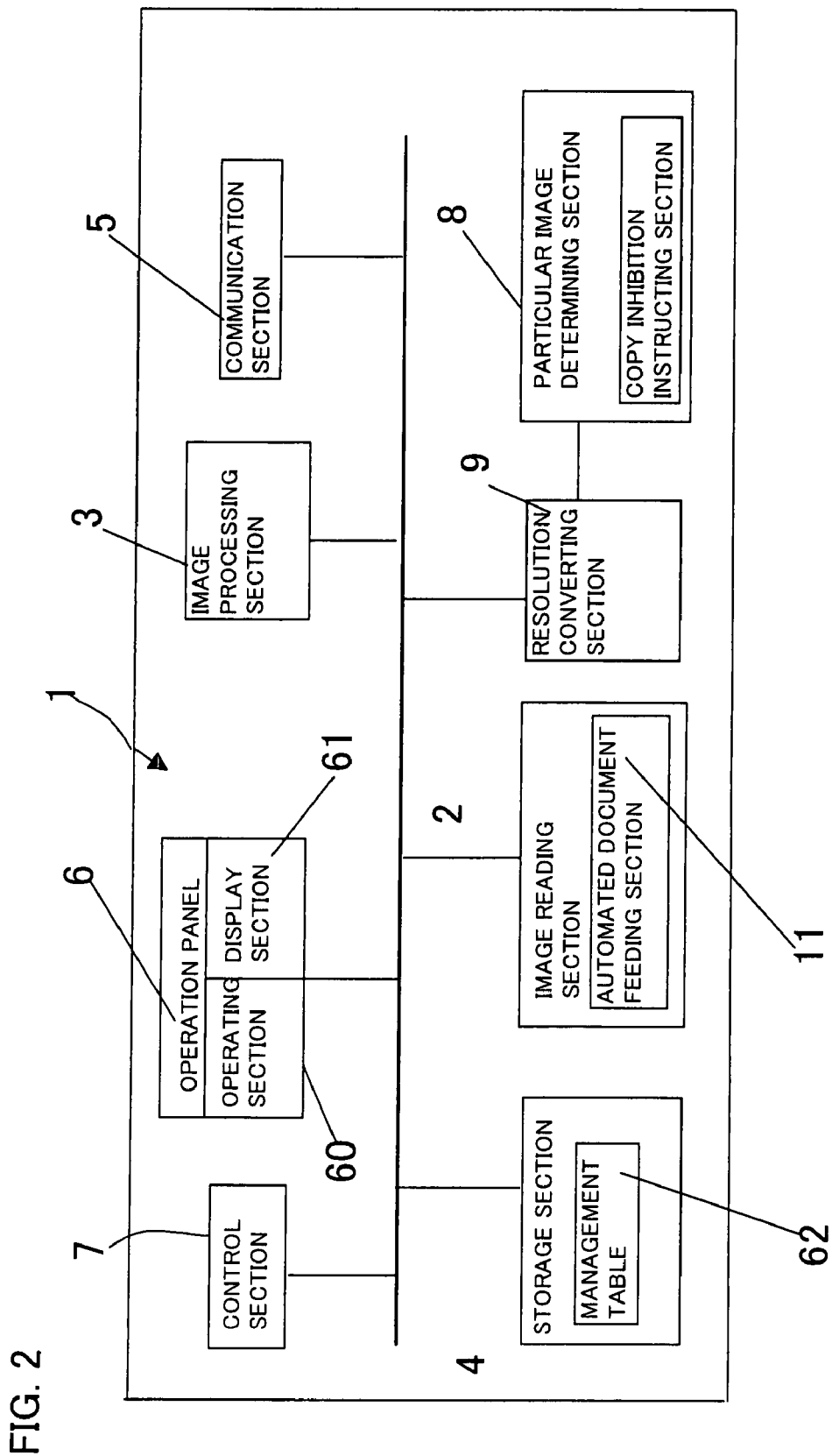
FIG. 2 is a control block diagram of the image processing apparatus.

FIG. 1 shows an image processing apparatus according to this embodiment, and FIG. 2 shows control blocks thereof. The image processing apparatus is a composite machine performing a copy mode, a print mode, a scanner mode and a facsimile mode. A cabinet 1 of the image processing apparatus includes an image reading section 2 for reading a document and inputting image data, an image processing section 3 for processing and printing image data, a storage section 4 for storing the image data, a communication section 5 for performing communication with an external apparatus, an operation panel 6 for input operations, a control section 7 for controlling the processing section and processing the image data according to a mode, a particular image determining section 8 for determining whether or not a particular image is included in the image data read by the image reading section and a resolution converting section 9 for changing a resolution of the image data to be transferred to the particular image determining section 8.

Figure 3:
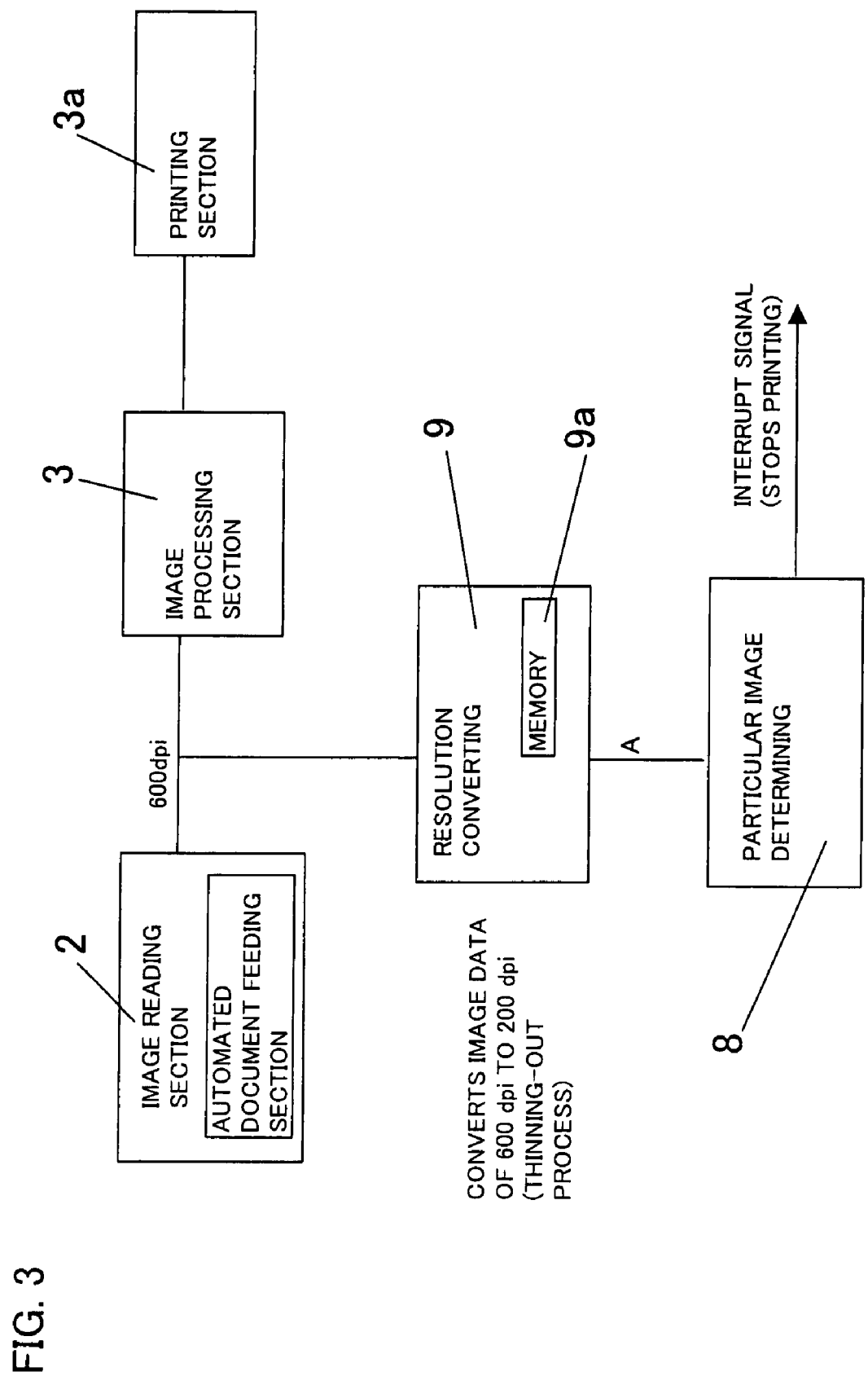
FIG. 3 is a detailed block diagram of principal parts of FIG. 2.

The image processing section processes the inputted image data in order to output it, and includes the image processing section 3, the storage section 4, the communication section 5 and a printing section 3a (refer to FIG. 3).

As shown in FIG. 1, the image reading section 2 is placed above the cabinet 1, and includes a scanner section 10 and an automated document feeding section 11. The automated document feeding section 11 is placed above the scanner section 10, and automatically feeds a document in order to read the image data of the document.

A document tray 12 made of a platen glass and a document cover 13 for covering the document tray 12 are provided on a top face of the cabinet 1. The automated document feeding section 11 is integrally mounted into the document cover 13. The document cover 13 is openable and closable. When the document cover 13 is closed, the document is fed by the automated document feeding section 11. When the document cover 13 is open, the document can be placed on the document tray 12. Opening and closing of the document cover 13 is detected by a cover opening and closing sensor. A document size detection sensor for detecting size of the document placed on the document tray 12 is also provided.

If the document is set on a document set tray 15 of the automated document feeding section 11, a document detection sensor 16 detects that the document has been set. And copy conditions such as the size of a sheet to be printed and a variable magnification are inputted on the operation panel 6. After that, reading of a document image is started by an input operation of a start key.

In the automated document feeding section 11, the documents on the document set tray 15 are pulled out one by one by a pickup roller 17. The document is fed to the document tray 12 by passing between a handling plate 18 and a feeding roller 19. The document is fed in a vertical scanning direction on the document tray 12 so as to be ejected onto a document eject tray 20. The document eject tray 20 is provided with a document eject sensor to detect whether or not there is the document on the document eject tray 20.

The scanner section 10 includes a first reading section 21 and a second reading section 22. A reading area is formed on one side of the document tray 12, and so the document passes through the reading area when fed on the document tray 12. A first scanning unit 23 of the first reading section 21 is positioned below the reading area so as to read a front face (underside) of the document.

When the document is fed to the document tray 12 by the automated document feeding section 11, the first scanning unit 23 is moved to a reading position and positioned, and a second scanning unit 24 is also positioned at a predetermined location. The front face of the document is illuminated from below the document tray 12 by an exposure lamp of the first scanning unit 23. Reflected light from the document is led to an imaging lens 25 by each reflecting mirror of the first and second scanning units 23 and 24. The reflected light of the document is collected on a CCD 26 by the imaging lens 25. The image on the front face of the document is formed on the CCD 26. Thus, the image on the front face of the fed document is read.

A backside (upside) of the document is read by the second reading section 22. The second reading section 22 is placed above the document tray 12, and is provided with an exposure lamp array including an LED and a fluorescent lamp for illuminating the backside of the document, a SELFOC lens array for collecting the reflected light of the document from each pixel, a contact image sensor (CIS) for photoelectrically converting the reflected light from the document received through the SELFOC lens array and outputting an analog image signal, and the like. The image on the backside of the fed document is thereby read.

Upon placing the document on the document tray 12, the image on the front face of the document is read by the first reading section 21. The first and second scanning units 23 and 24 move to the vertical scanning direction while mutually maintaining predetermined speed relationship. The document on the document tray 12 is exposed by the first scanning unit 23, and the reflected light from the document is led to the imaging lens 25 by the first and second scanning units 23 and 24. The image on the document is formed on the CCD 26 by the imaging lens 25.

If the image or images on one or both sides of the document are thus read, the image data on one or both sides of the document is inputted to the control section 7. The control section 7 includes an image data processing section which performs various image processing on the image data. The image data is outputted to the image processing section 3.

The image processing section 3 includes a printing section 3a for printing a color image or a monochrome image on a sheet based on inputted image data. The printing section 3a is provided with a laser scanning unit 30, four image stations 31, an intermediate transfer belt unit 32, a fixing apparatus 33 and a feeding apparatus 34.

Each of the image stations 31 forms a color image according to each of the colors of black, cyan, magenta and yellow. Each of the image stations 31 is provided with a photoreceptor drum 35, a development apparatus 36, a charging apparatus 37, a cleaning apparatus 38 and a neutralization apparatus (not shown).

The photoreceptor drum 35 is rotatively driven in one direction. The cleaning apparatus 38 cleans a residual toner on the surface of the photoreceptor drum 35. The neutralization apparatus removes electricity on the surface of the photoreceptor drum 35. And the charging apparatus 37 evenly charges the surface of the photoreceptor drum 35.

The laser scanning unit 30 modulates a laser beam based on the image data inputted from the image reading section and the like, and repeatedly scans the surface of the photoreceptor drum 35 with the laser beam in a main scanning direction so as to form an electrostatic latent image on the surface of the photoreceptor drum 35. The development apparatus 36 supplies the toner to the surface of the photoreceptor drum 35 and develops the electrostatic latent image so as to form a toner image on the surface of the photoreceptor drum 35.

The intermediate transfer belt unit 32 includes an intermediate transfer belt 40, an intermediate transfer roller 41, a transfer belt cleaning apparatus 42 and a tension mechanism 43. The intermediate transfer belt 40 is placed above each photoreceptor drum 35, is wound around a driving roller 44 and a driven roller 45 so as to rotate in an arrow B direction.

The intermediate transfer roller 41 is placed opposite the photoreceptor drum 35 by sandwiching the intermediate transfer belt 40, and has a transfer bias voltage applied thereto. An opposite polarity voltage to the toner is applied to the intermediate transfer roller 41 so that the toner image on the surface of the photoreceptor drum 35 is transferred to the intermediate transfer belt 40. The toner image in each color is stacked on the intermediate transfer belt 40, and a synthesized multicolor toner image is formed.

The transfer roller 41 is placed in pressurized contact with the intermediate transfer belt 40, and has a voltage opposite polarity to the toner applied thereto. The toner image on the intermediate transfer belt 40 is transferred onto a sheet fed between a transfer roller 46 and the intermediate transfer belt 40 by the transfer roller 46. The toner remaining on the intermediate transfer belt 40 is removed by the transfer belt cleaning apparatus 42.

The toner image transferred to the sheet is fixed on the sheet by being heated and pressurized by the fixing apparatus 33 so that the image is formed on the sheet. The sheet thus having the image printed thereon is ejected to an eject tray 50 provided on the top of the cabinet 1.

The feeding apparatus 34 feeds the sheet along a paper path 53 from a sheet cassette 51 or a manual tray 52. The paper path 53 passes between the intermediate transfer belt 40 and the transfer roller 46 and through the fixing apparatus 33 so as to reach the eject tray 50.

The feeding apparatus 34 includes a pickup roller 54, a feeding roller 55, a resist roller 56 and an ejection roller 57. The sheets of the sheet cassette 51 or the manual tray 52 are fed to the paper path 53 one by one, fed along the paper path 53 and ejected to the eject tray 50. The image is printed on the sheet during the feeding of the sheet. A switchback path 58 is provided for the sake of both side printing. The sheet after fixing is fed between the intermediate transfer belt 40 and the transfer roller 46 after being passed through the switchback path 58 by the feeding roller 55. The sheet having undergone the both side printing passes through the fixing apparatus 33 to be ejected onto the eject tray 50.

The operation panel 6 is provided to the scanner section 10, and includes an operating section 60 and a display section 61. The operating section 60 includes various operation keys. The display section 61 is composed of a liquid crystal display, which is touch-panel. Touch keys are formed in an operation screen displayed in the display section 61, and they also function as operation keys.

The communication section 5 includes a communication interface, which is connected to a network such as a LAN or a WAN. The network is connected to multiple external apparatuses. The external apparatuses are other image processing apparatuses, information processing apparatuses such as personal computers, and servers. The network is connected to the Internet from a router via communication lines such as a telephone line and an optical fiber. The communication section 5 can perform communication with the external apparatuses by a predetermined communication protocol through the network. The image processing apparatuses can also perform communication among themselves. The communication inside the network may be either wired or wireless. An image processing system is formed by these image processing apparatuses and external apparatuses.

The communication section 5 also includes a modem apparatus. The modem apparatus is connected with the telephone line. The image processing apparatus can perform facsimile communication. The image processing apparatus can also perform data communication by an Internet facsimile through the network. The communication section 5 further includes communication terminals and a communication card for wireless communication. The communication terminals are connected with storage media such as a USB memory and an IC card, and the communication section 5 transmits and receives data to and from the storage media. The communication section 5 also transmits and receives data to and from the communication terminals such as a cell-phone and a PDA by the wireless communication through the communication card.

The storage section 4 is composed of a hard disk drive. The storage section 4 stores the image data inputted from the image reading section 2 or the image data inputted from the communication section 5. The inputted image data is once stored in an image memory such as a DRAM, undergoes the image processing and encryption processing and is then transferred to the storage section 4 from the image memory. When reading the image data from the storage section 4, the image data undergoes the image processing and decryption processing and is then stored in the image memory. After that, the image data is outputted to outside by printing, data communication and facsimile communication according to an executed process.

The storage section 4 includes a management table 62. The management table 62 stores the necessary information for operating the image processing apparatus, such as control information and setting information on the image processing apparatus and authentication information on a user. If such information is created or changed, the information of the management table 62 is updated. The management table 62 may also be provided to a nonvolatile memory other than the storage section 4.

The control section 7 is composed of a microcomputer including a CPU, a ROM and a RAM, where the CPU reads a control program stored in the ROM to the RAM so as to execute the control program. Each of the sections operates according to the control program. If the image data is inputted, one of the print mode, copy mode, scanner mode and facsimile mode is executed based on processing conditions included in input information from the operating section 60 and header information of the image data inputted from the external apparatus. Moreover, the control program includes a browser and mail software so that the control section 7 performs the data communication with the external apparatus and transmits and receives e-mail by the communication protocol such as a TCP/IP protocol.

The control section 7 temporarily stores the inputted image data in the storage section 4 when performing each of the modes. The control section 7 also executes a filing mode for storing and managing the inputted image data in the storage section 4. The stored image data is outputted again according to a designated process. The outputted image data is erased from the storage section 4 according to an instruction from the control section 7. On the erasure, the image data is invalidated so as not to be restorable by overwriting the image data with random data. Thus, the invalidation processing is performed and the encryption processing is further performed so as to prevent unauthorized use of the image data.

Here, to prevent a confidential document from being unauthorizedly copied or facsimile-transmitted, a specific image is added to the document. The specific image represents regulatory information for regulating the processes to be executed, such as copy inhibition, lowering of printed image quality, inhibition of data transmission and facsimile transmission and filing inhibition.

The control section 7 generates the image data having synthesized the specific image, and performs the processing such as printing, data transmission and filing of the synthesized image data. Image information on the specific image is stored in the management table 62 in advance. The image information includes a form, an image forming condition and a position of the specific image. The control section 7 reads the image information and generates the specific image based on the image information so as to synthesize it with inputted image data.

The image data including the specific image is data-transmitted through the communication section 5. If the image data is printed on the image processing apparatus which has received the image data, a document including the specific image is created. The specific image is in the form having a predetermined pattern. Otherwise, the specific image may be a character image such as "copy inhibition" or "confidential" or in the form combining characters and a pattern.

The specific image of the document is read by the image reading section 2 though it is hardly visible to human eye. If one or both sides of the document are read by the image reading section 2, the image data on one or both sides of the document is inputted to the control section 7. The control section 7 includes the image data processing section, which performs various image processing on the image data so as to output it to the image processing section 3 and the resolution converting section 9. The image data is transferred to the image processing section 3 and to the resolution converting section 9 by different buses in order to rapidly perform parallel processing.

The resolution converting section 9 performs a thinning-out process of the image data. In the thinning-out process, the image data is thinned out both in the main scanning direction and in the vertical scanning direction of the image data. For instance, the image data of 600 dpi is thinned out to be the image data of 200 dpi. The processed image data is stored in a memory 9a of the resolution converting section 9. As the resolution of the image data is lowered by the thinning-out process, a pixel frequency (transfer rate and processing speed of the image data) can be lowered.

Therefore, the resolution converting section 9 includes a frequency varying section for varying the pixel frequency of the image data transferred from the image reading section 2. The frequency varying section lowers the pixel frequency of the image data. For instance, if the pixel frequency of the image data transferred from the image reading section 2 is 30 MHz, the frequency varying section lowers it to 10 MHz.

Figure 4:
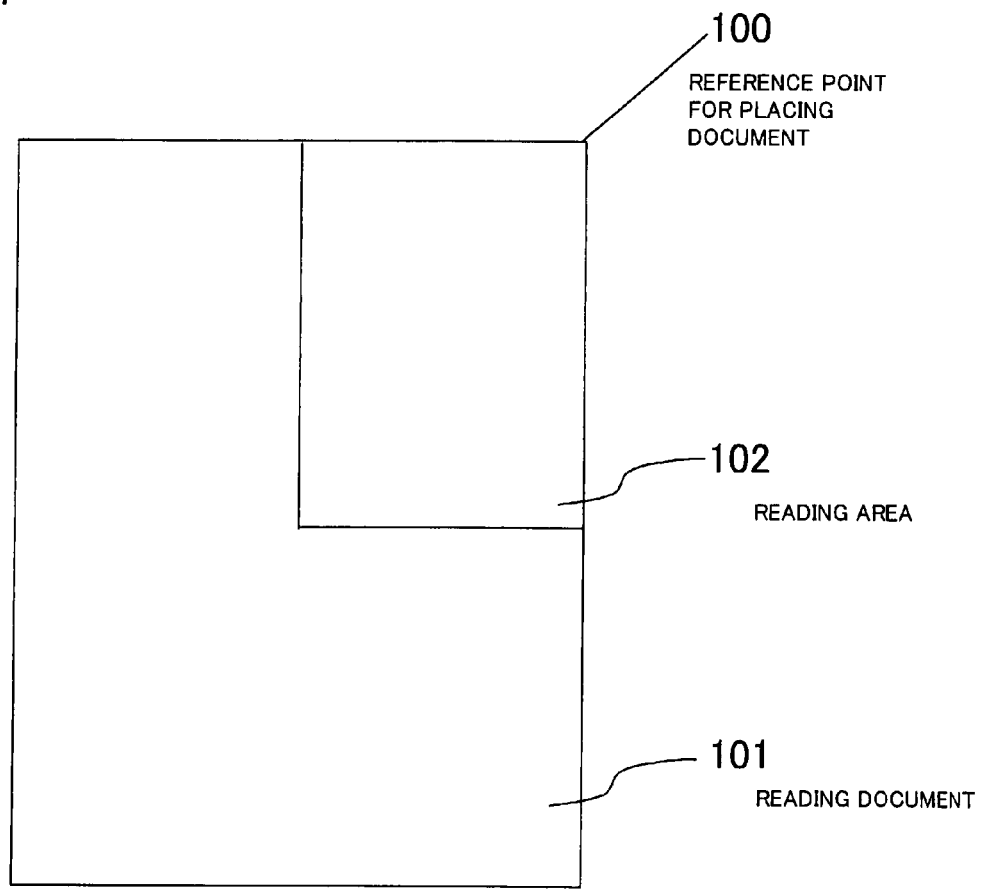
FIG. 4 is a diagram showing a positional relation between a reading area of a reading document and a reading area of a particular image.

A rate of variation of the pixel frequency of the image data is changeable by the reading area of the reading document. By way of example, the pixel frequency of the image data is changed according to the rate of variation of the image data. For instance, in the case where both the reading document and a printing sheet for outputting the image are A4 size and a magnification ratio is set at 400%, only the image data of ¼ of a reading document 101 from a reference point for placing the document 100 is read (this area is referred to a reading area 102) without reading the rest of the image as shown in FIG. 4. To be more specific, only an image area printable according to a set magnification is the reading area 102. In this case, the data amount of the image data in the reading area 102 becomes lower than the case of reading the entire reading document 101. Therefore, the image data inputted from the image reading section 2 to the resolution converting section 9 is reduced so that the pixel frequency of the image data in the resolution converting section 9 can be lowered.

Similarly, the image processing apparatus including an edit function can set the reading area when reading the image data. Therefore, it is possible to lower the pixel frequency of the image data according to the set area (dimensions).

The information on the variable magnification of the read image is inputted from the image reading section 2 to the resolution converting section 9 via the control section 7. The frequency varying section of the resolution converting section 9 varies the pixel frequency based on the inputted information on the variable magnification. The resolution converting section 9 transfers the image data to the particular image determining section 8 at the converted pixel frequency.

The transferred image data is determined according to the pixel frequency thereof by the particular image determining section 8. Therefore, in the case where the pixel frequency of the image data is low, the particular image determining section 8 increases processing time per pixel so that detection accuracy of the particular image can be improved by that much.

The particular image determining section 8 detects whether or not the inputted image data includes the particular image, and determines whether or not the particular image has exceeded a reference level (threshold). The image data is not limited to the data inputted from the image reading section 2 but may also be the data inputted from the external apparatus, the storage medium or the communication terminal through the communication section 5.

The particular image determining section 8 has its operation controlled by the control section 7, and detects the particular image by pattern-matching the inputted image data with the image data corresponding to the particular image. The image data corresponding to the particular image is registered in advance, and is stored in the management table 62 of the storage section 4. The particular image determining section 8 counts the number of the detected particular images, and determines whether or not the number of the detected particular images has exceeded the threshold. In the case where the image data is in units of pages, the number of the particular images is calculated as to each page. Or else, the number of the particular images in a predetermined area dimension is calculated.

When the inputted image data includes the particular images in excess of the threshold, the control section 7 outputs a signal for limiting the process to be executed from the particular image determining section 8 to the image processing section 3 side. To be more specific, the control section 7 gives an instruction of copy inhibition when in the copy mode, and gives an instruction of transmission inhibition when in the facsimile mode or the scanner mode. The control section 7 also gives an instruction to inhibit storage of the image data in the storage section 4 when in the filing mode.

As shown in FIG. 3, in the configuration, the output from the scanner is branched, where one is transmitted to the image processing section 3 for performing printing while the other, which is the same read image data, is outputted to the particular image determining section 8 for determining the particular image. The image data transmitted to the image processing section 3 undergoes the image processing necessary for printing such as concentration correction and tone correction, and is transmitted to the printing section 3a so as to form the image on a recording paper.

The image data transmitted to the particular image determining section 8 is inputted to the resolution converting section 9, where the resolution of the image data is converted. To be more specific, the resolution converting section 9 lowers the resolution of the inputted image data. For instance, the inputted image data of 600 dpi is thinned out in the main scanning direction and the vertical scanning direction so as to be converted to the image data of 200 dpi. If the thinning-out process is performed, the pixel frequency of the image data can be lowered.

To be more specific, as for the transmission of the image data from the image reading section 2 to the image processing section 3 or the resolution converting section 9, the image data of 600 dpi is transmitted in synchronization with a 30 MHz clock for instance in order to speed up the processing of the image data. If the resolution is converted (lowered) to the image data of 200 dpi by the resolution converting section 9, however, the transfer rate from the resolution converting section 9 to the particular image determining section 8 can be lowered from 30 MHz to 10 MHz or so.

Even in the case of such a pixel frequency of 10 MHz, the image data of 200 dpi is transferred to the particular image determining section 8, which is processing ability equivalent to the case of transferring the image data of 600 dpi at 30 MHz clock.

Thus, according to this embodiment, the resolution converting section 9 lowers the resolution of the image data and also lowers the pixel frequency so as to transfer it to the particular image determining section 8. Therefore, the transfer rate from the output (point A) of the resolution converting section 9 is reduced, and the number of gates of the particular image determining section 8 is reduced to allow cost reduction. The particular image determining section 8 performs the processing at processing speed according to the pixel frequency. Therefore, the processing time per pixel can be extended, and determination accuracy of the particular image can be further improved. The particular image determining section 8 normally operates at 30 MHz clock. If the processing speed is reduced to 15 MHz clock or so, the processing time per pixel becomes twice, and thus the processing time per pixel is extended to allow the detection accuracy to be improved. Moreover, the pixel frequency is lowered, and the transfer rate of the data from the resolution converting section 9 to the particular image determining section 8 is thereby reduced. Therefore, influence of noise can be reduced.

What is claimed is:

1. An image processing apparatus comprising:
   an image reading section for reading a document image;
   a particular image determining section for determining whether or not a particular image is included in image data read by the image reading section;
   an image processing section for processing the image data; and
   a resolution converting section for changing a resolution of the image data to be transferred to the particular image determining section,
   wherein the resolution converting section lowers a resolution of the image data to be transferred to the particular image determining section and varies a pixel frequency of the image data to be transmitted to the particular image determining section for causing the pixel frequency to be lowered, thereby slowing down a transfer rate of the image data and a processing speed for determination of the particular image determining section, thus resulting in an extension of a processing time per pixel.

2. The image processing apparatus according to claim 1, wherein the image data read by the image reading section is transferred to the image processing section and to the particular image determining section by different buses.

3. The image processing apparatus according to claim 1, wherein:
   the image reading section varies a reading area for causing the reading area to be reduced according to a magnification ratio; and
   wherein a data amount reduced according to the reading area of the image data is inputted from the image reading section to the resolution converting section and the pixel frequency of the image data is varied so as to be lowered according to the reduced data amount, thereby slowing down the transfer rate of the image data and the processing speed for determination of the particular image determining section, thus resulting in an extension of the processing time per pixel.

4. An image processing method comprising:
   a step of reading a document image;
   a resolution converting step of converting a resolution of the read image data;
   a particular image determining step of determining whether or not a particular image is included in the image data of which the resolution has been converted; and
   an image processing step of processing the image data based on a determination result thereof,
   wherein the resolution converting step lowers a pixel frequency of the image data to be transmitted for determination of the particular image and varies the pixel frequency of the image data to be transferred to the particular image determining step for causing the pixel frequency to be lowered, thereby slowing down a transfer rate of the image data and a processing speed for determination of the particular image determining section, thus resulting in an extension of a processing time per pixel.

5. The image processing method according to claim 4, wherein the image reading step varies a reading area of the document image so as to be reduced according to a magnification ratio; and
   wherein a data amount reduced according to the reading area of the image data is inputted from the image reading step to the resolution converting step and the pixel frequency of the image data is varied so as to be lowered according to the reduced data amount, thereby slowing down the transfer rate of the image data and the processing speed for determination of the particular image determining section, thus resulting in an extension of the processing time per pixel.

6. The image processing method according to claim 4, wherein the image data read by the image reading section is transferred to the image processing section and to the particular image determining section by different buses.

* * * * *